United States Patent [19]
Robinson

[11] Patent Number: 5,533,545
[45] Date of Patent: Jul. 9, 1996

[54] DRAIN SYSTEM

[75] Inventor: Larry P. Robinson, Depew, N.Y.

[73] Assignee: Air System Products, Inc., Lancaster, N.Y.

[21] Appl. No.: 504,058

[22] Filed: Jul. 18, 1995

[51] Int. Cl.⁶ .................................................. F16K 31/34
[52] U.S. Cl. .............................. 137/195; 137/448; 251/65
[58] Field of Search ................................. 137/195, 448; 251/65

[56] References Cited

U.S. PATENT DOCUMENTS

| | | | |
|---|---|---|---|
| 605,084 | 6/1898 | Dale | 137/448 |
| 1,894,367 | 1/1933 | Corcoran | 137/416 X |
| 2,893,427 | 7/1959 | Felgate | 251/65 X |
| 3,822,933 | 7/1974 | Johnson | 251/65 |
| 4,481,389 | 11/1984 | Johnson | 251/65 X |
| 4,577,657 | 3/1986 | Alexander | 251/65 X |
| 5,004,004 | 4/1991 | Cummings | 137/195 |
| 5,080,126 | 1/1992 | De Rycke et al. | 137/195 X |

*Primary Examiner*—Gerald A. Michalsky
*Attorney, Agent, or Firm*—James J. Ralabate

[57] ABSTRACT

This invention involves a liquid drain system with liquid entrance and exit components to be used in or with compressed air systems. The system has a reservoir to hold accumulated liquid and a float in the reservoir that will be movable with the liquid level in the reservoir. So that liquid flows out of the system an air entrance and air exit is provided. The air entrance and air exit is controlled by magnetic and metallic components. When the float is in a lower position in the reservoir, the metallic component is in a closed position. When the float is in an upward position, the metallic component opens the flow passages to permit the liquid to exit the reservoir. An air inlet to the reservoir is provided to cause pressure to allow the liquid to flow out through an exit port.

6 Claims, 2 Drawing Sheets

DRAIN SYSTEM

This invention relates to a drain system and, more particularly, to a drain designed to remove condensation from compressed air systems.

BACKGROUND OF THE INVENTION

It is known to use known drainage apparatus to eliminate condensate from pressurized air systems. When air is compressed there is a normal resulting moisture or condensate which, if allowed to remain in the system, could cause damage and corrosion in the system. In high volume or capacity applications, large amounts of moisture are formed which must be constantly drained and discharged from the assemblage. Preferably, an automatic drain is used to avoid over-accumulation of water and to allow the pressurized system to function properly.

There are various float valve assemblies presently used to remove condensed moisture from compressed air systems. Some are described in U.S. Pat. Nos. 4,444,217; 4,562,855; 4,574,829; 4,779,640; 5,004,004 and 5,014,735, all issued to E. W. Cummings or E. W. Cummings et al; hereinafter "Cummings patents". A further float type drain for condensed air systems is disclosed in U.S. Pat. No. 5,080,126 to DeRycke.

In the Cummings patents, various automatic drain traps are disclosed, each differing in structure but similar in function. Some of the Cummings patents disclose float activated water discharge systems and others of various configurations. Drain-All Inc. of P.O. Box 609, Louisville, Tenn. 37777 markets a compressed air drain similar to those disclosed in some of the Cummings patents. These Drain-All apparatus require the use of a large float to give buoyancy to a relatively large and heavy magnet. Any large size float in any system will take up a large amount of space in the liquid reservoir. This reduces the amount of liquid that can be drained per cycle. If it is desired in these prior art systems to drain more condensation, the size of the vessel would have to be enlarged to provide a larger reservoir. To do this, the device weight would have to be increased with the resulting disadvantages associated with this. These prior art devices most or all require the use of a vent line on all applications. The vent line is required to let the displaced air in the system escape as the water enters the reservoir. Vents are required when the condensation enters from the bottom of the reservoir such as in these prior art devices. An advantage of using a bottom only entry port is to keep any metal scale from attaching itself to the large magnet of the prior art units.

In the DeRycke patent a float controlled valve is also used to discharge moisture in a compressed air system. In apparatus similar to DeRycke's, a poppet valve is used which often will not seat properly when scale and other particulate matter is ejected from the system. These prior art devices usually have five pivot points. The large number of pivot points and the use of two seats and two magnets increase the chance of failure due to wear or misalignment of these complex designs. Also, in similar prior art structures, two of the pivot points are likely to be submerged in condensation during normal operation. One of the elements commonly contained in condensation is oil which floats on top of water. This oil will thicken and coat surfaces with varnish. The result will increase the possibility that the two pivot points could bind and cause a failure.

There is therefore a need for a further improved and efficient system for removing moisture from condensed air systems.

SUMMARY OF THE INVENTION

It is therefore an object of this invention to provide a drain system for condensed air assemblies devoid of the above-noted disadvantages.

Another object of this invention is to provide a more efficient and lightweight apparatus for condensation draining which is easier than prior art devices to install.

Still a further object of this invention is to provide a drain apparatus that allows drainage of the same amounts of condensation as prior art devices and yet using a smaller resevoir.

Yet a further object of this invention is to provide a drain apparatus that, while very efficient, is compact and will permit installation on applications that are close to the floor.

A further object of this invention is to provide a drain apparatus having both a top and bottom entry port which eliminates the requirement of a vent line.

Another still further object of this invention is to provide a drain system that is less costly and easier to install.

Still yet another object is to provide a drain system with means that minimizes improper sealing of liquid ejecting outlets and reduces instances of misalignment.

Yet still another object of this invention is to provide a float type drainage system where all pivot points are located above the level of condensation thereby avoiding possible failure of these components.

These and other objects of this invention are accomplished generally speaking by a novel drain for removing condensation from compressed air units. This drain comprises a generally cylindrical reservoir fitted between two blocks of aluminum or any other suitable material. The reservoir is preferably transparent so that the level of accumulated condensate can be easily viewed and determined. Obviously, any type reservoir may be used transparent or not. Within the reservoir is a valve housing having movably connected thereto a float lever arm which moves up or down depending upon the level of condensate within the reservoir. On one end of this lever arm is a float which floatably contacts the water or liquid level. On the opposite end of this lever arm is a metallic component that is adapted to be attracted to any adjacent magnet. When the float is in its downward positions, the metallic component is at its upper positions (closed position) and when the float is in its upward positions the metallic component is at its lower positions (open position) opening the flow passages to permit the condensate or liquid to exit the reservoir. These float and metallic component positions are clearly illustrated in FIGS. 1 and 2 discussed below.

The unit of this invention is fully automatic, no electricity is required. Its low profile gives the advantage of installing it in areas where the vessel to be drained is only a few inches from the ground. The design also eliminates the need for the installation of a vent line for most applications. A unique air valve design uses a magnetic force to ensure both a positive opening and closing that will prevent any air loss. The magnetic force is uniquely positioned away from the condensation level to prevent any attraction of metal particulate. An innovative ball valve support and positioning system prevents the side-loading problem which otherwise would cause premature sealing failure around the valve stem. Rifle drilled discharge porting ensures that scale and rust will exit through a fully ported ball valve. The drain of this invention will not clog; no strainer is required in operation. Condensation enters one of two ports. As noted earlier, the see-through vessel allows visual inspection of the condensation as it rises. A stainless steel (or other material) float rises with the level of condensation and positions a magnetic force over the valve housing. When the liquid level reaches the desired level, the magnet in the valve housing snaps upward and allows air to pass through a stainless steel seat. The air then moves to a non-lubricated air cylinder causing it to extend and open the ball valve. Condensation, scale and rust particles rapidly exit the unit. Before any air is lost, the float removes the magnetic force from the valve and the seat is covered with a Viton seal which is a fluroelastomer, Viton is a trademark of DuPont de Nemours. A powerful spring returns the air cylinder to its normal position and rotates the positive closing ball valve back to its normally closed position. The pilot air used to actuate the air cylinder is isolated from the air in the drain's reservoir.

While float type devices have been known not only in drain devices but also in other commercial uses such as toilet fixtures, the present invention provides a valve housing that controls the precise opening and closing of the liquid flow system. The preferred specifications for the present drain apparatus are as follows, however any other suitable specifications may be used:

Inlets: (2) ¾" NPT and ½" NPT

Outlet: ½" NPT

Power: Clean, Dry Compressed Air 80 to 130 PSI

Housing Pressure: 0 to 200 PSI

Operating Temperature: 32° to 180° F.

Weight: 16 lbs.

Discharge: 24 Ounces per cycle

The drain of this invention functions without requiring any electrical power and will operate without wasting any compressed air. This is important since compressed air is costly to produce. The system of this invention will ensure that any media (water, oil, scale, etc.) will not prevent the drain from opening and closing properly; this is a common problem with prior art devices. A critical aspect of the present invention is the construction and function of the valve housing and how it is actuated. Since the levers used in the present drain lay horizontally (i.e. parallel to the axis of a supporting surface) it allows the structure to have a low profile.

DETAILED DESCRIPTION OF THE DRAWING AND THE PREFERRED EMBODIMENTS

Figure 1:
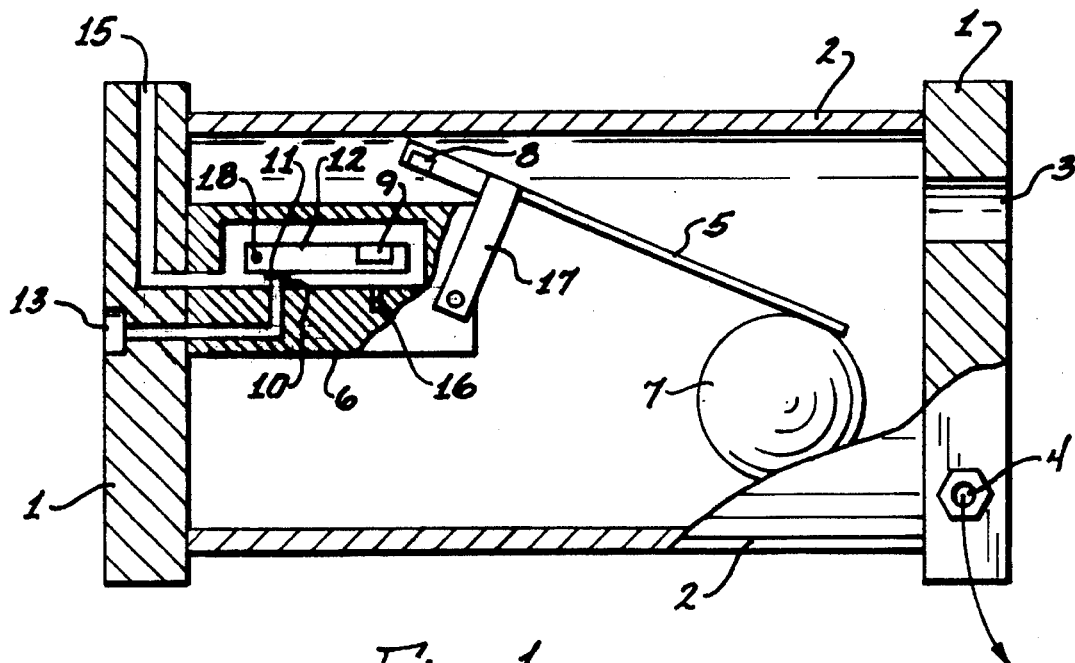
FIG. 1 is a side plan view of the interior of the drain structure of this invention when the flow-through components are in the closed or normal positions.

The drain system of this invention comprises a cylindrical reservoir 2 attached to and positioned between two aluminum blocks 1. A condensate entrance opening or conduit 3 allows condensation from the compressed air system to enter reservoir 2 for accumulation and eventual elimination. Since the reservoir 2 is preferably made of a translucent material, the user can easily see how much condensation has accumulated at any time. A liquid flow exit 4 conduit is located at a lower section of the drain system. Both entrance conduit 3 and liquid flow exit 4 open into reservoir 2 and are in flow connection thereto and can be located at any convenient place on the reservoir 2. Air is allowed to enter reservoir 2 via air inlet 15 and flows through air outlet 13 to air cylinder 14. Thus, condensate or liquid enters the reservoir 2 through entrance conduit 3 and the liquid leaves reservoir 2 through exit 4 when a set amount of liquid has accumulated. The component that controls the flow of liquid out from the reservoir 2 is a lever arm 5 and valve housing 6. Lever arm 5 has attached at one end a float 7 and at the opposite end of lever arm 5 is positioned a metallic component 8. The metallic component 8 is positioned so as to be superimposed over and above a valve magnet 9 and in a magnetical attractable distance therefrom. When float 7 is in its lower position as shown in FIG. 1, there is little or no liquid condensate in the reservoir 2. This is since the float 7 position reflects the liquid level upon which it is supported. When lever arm 5 is slanted downwardly as shown in FIG. 1, the metal component 8 is forced away from valve housing 6 and the magnet 9 located therein. Inside of the valve housing 6 is a seat (hole) 10 which is sealed closed with a seal 11. The seal is attached to a valve lever 12. The seat 10 is mounted to the bottom of the base of the valve housing 6. The end of the valve lever 12 has a pin 18 that allows the lever to pivot. When the valve lever 12 is pivoted in an upward manner, the seal 11 will lift far enough from the seat 10 to open up the seat and let compressed air in via 15 and exit through the seat 10 and out air exit 13. The other end of the lever 12 has a magnet 9 attached. The weight of the magnet 9 with the use of leverage helps keep the seal 11 pressed tightly over the seat 10. A tight seal will prevent compressed air escaping while the drain is waiting for the reservoir 2 to fill with condensation. In addition, a small metal object or component 16 is located in the base of the valve housing 6 under the magnet 9. The attraction of the magnet to metal also supplies an additional force on the seal and seat to keep any compressed air from leaking out.

As the float 7 rises in the reservoir 2 outside of the valve housing 6, the metal component 8 is lowered toward the cover of the valve housing 6. When the metal component 8 on the lever arm 5 gets close enough to the valve cover, it attracts the magnet 9 inside of the valve assembly 6. This attraction causes the valve lever 12 to pivot upward, which also lifts the seal 11 off the seat 10. The attraction to the outside metal object 8 occurs because the metal object 8 on the lever arm outside is greater than the metal object 16 located inside at the bottom of the valve base.

Figure 2:
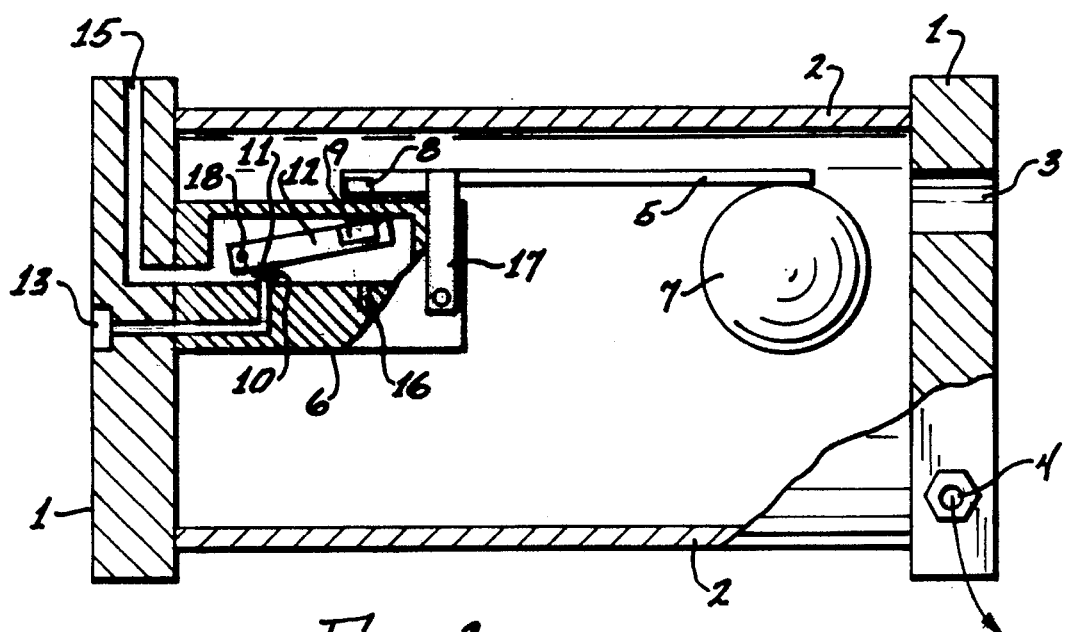
FIG. 2 is a side plan view of the interior of the drain structure of this invention when the flow-through components are in the open flow positions.
Figure 3:
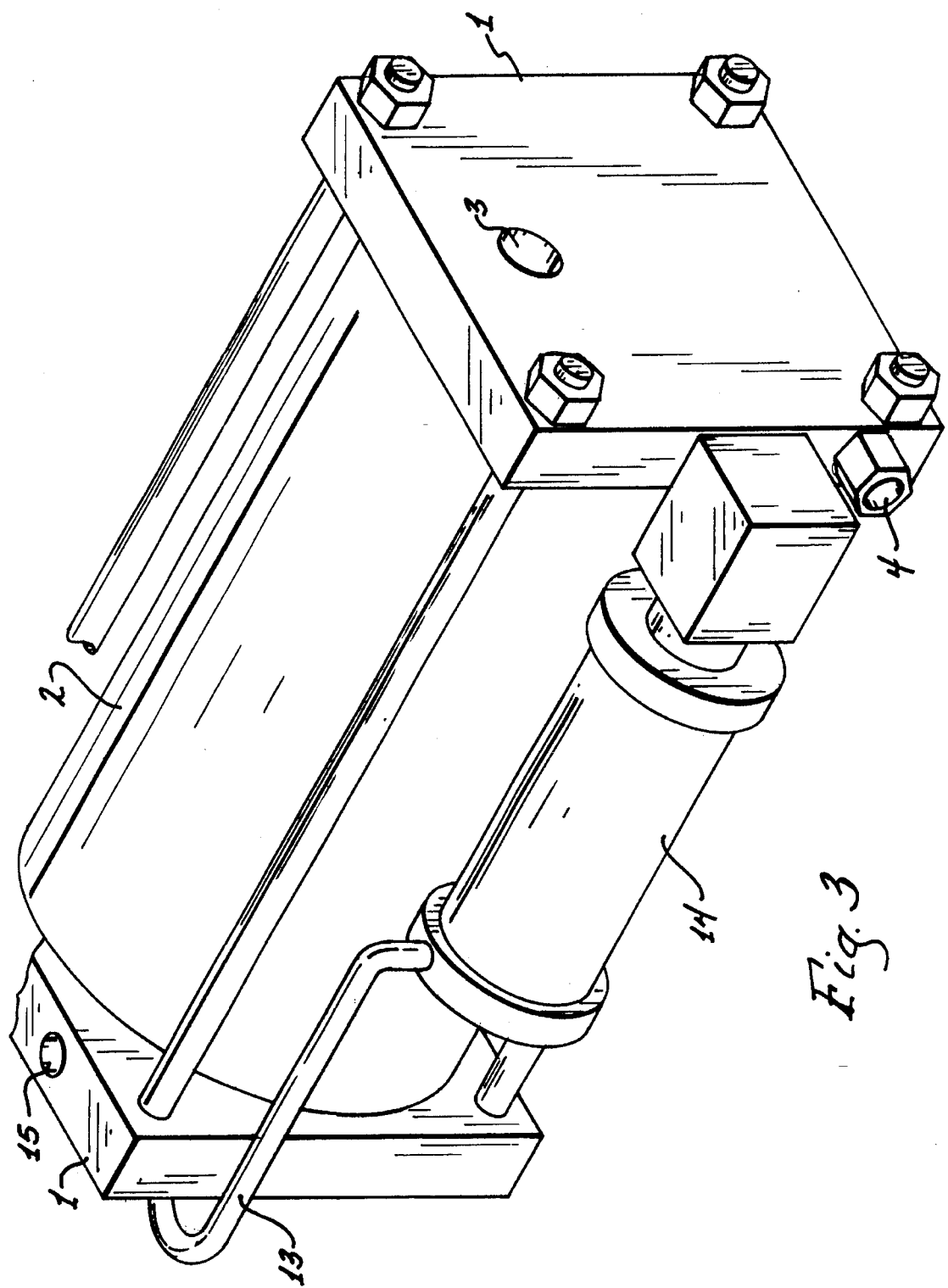
FIG. 3 is a side perpsective view of the exterior of the drain structure of this invention.

In FIG. 2 when the seal 11 has lifted from the seat 10, the compressed air is allowed to leave the valve housing via air exit port 13 and move toward an air cylinder 14 as shown in FIG. 3. The air cylinder 14 is basically a piston with a rod attached. When compressed air is allowed to enter the cylinder 14, the air pressure is great enough to overcome the spring tension of the spring located within the cylinder 14 and the piston is pushed which causes the rod to extend. The rod is connected to ball valve by the use of a lever arm. As the rod is extended, the lever arm moves the ball valve into an open position. When the valve is in the open position, the condensation is allowed to exit the reservoir via liquid exit port 4.

As the level of condensation in the reservoir 2 goes down, the buoyancy that held up the float 7 is removed. Without the buoyancy, the weight of the float 7 is sufficient to break the magnetic attraction of the magnet 9 and the metal component 8 on the opposite end of the lever 5 that holds the float 7. Lever 5 is supported by and pivots on lever arm 17. The magnet 9 is then pulled by its weight and gravity back to the base of the valve housing 6. This then causes the air supply to the air cylinder to be cut off. Air that is still trapped in the air cylinder 14 is bled off through a small orifice in the supply line from the air exit port 13 to the air cylinder 14. As the air escapes from the cylinder via port 13, the spring within the cylinder 14 is allowed to return the cylinder 14 to its normal retracted position. At the same time, the lever arm which is connected to both the cylinder and the ball valve rotates causing the ball valve to return to a normally closed position.

Perhaps the most important difference from the prior art is how the valve of this invention is actuated. The present drain uses only one magnet, two levers and the principle of leverage. This allows internal components, like the float, to be small. Prior art devices use two magnets, reverse polarity and a very large float to support the outer magnet.

Since the present drain uses levers it must lay horizontally versus prior art vertical designs. This allows the present drain to have a lower profile. This can be important because some applications will require a drain with a low profile. In these cases, the prior art units could not be used while the unit of the present invention could.

Also, because of the design of the present invention, condensation can enter the drain from above the condensate level without interfering with the operation of the drain. Prior art devices several years ago redesigned their drain from a top entry for condensation to a bottom entry only. We believe the reason for this was that the scale that entered through the top of the drain was attracted to the large magnet in their float. When enough scale was attached to the magnet, it could prevent the drain from operating properly. To prevent this problem, we believe they redesigned the unit to have the condensate enter the drain at the bottom so the scale would not be attracted to the magnet. However, this redesign required that a vent line had to be installed. A vent line allows the air to escape the reservoir as the condensation enters the drain. The vent line added cost to their drain and also increases the cost of installation In addition, some users found that they could not easily install a vent line. Since the present drain will not require a vent line, the design will prove to be more adaptable and convenient to use.

The present invention also differs from prior art units by providing extra support for the ball valve stem. To obtain this extra support, a bracket to the ball valve could be mounted. The bracket will eliminate side load pressure on the valve stem. This will increase the life of the valve seals.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. An automatic liquid drain system comprising in combination a liquid reservoir, air exit means, a lever arm, a float air control means and a valve housing, said lever arm, said air control means and said valve housing all located entirely within said reservoir, said lever arm having a fulcrum attached to said valve housing, said lever arm having said float attached on one of its terminal ends and a metallic component on an opposite terminal-end, said metallic component adjacent and above said valve housing, said valve housing having means in cooperation with said float means and said metallic component to open and close an air hole of said air control means, said float movable with a varying liquid level in said reservoir, said float in an upper position having means to permit air to enter said valve housing via an air supply inlet, said air control means comprising an air hole located in air flow connection from said valve housing to said air exit means, said air control means also comprising a valve lever therein having a magnet adjacent a first valve lever end portion and a seal on a second valve lever end portion, said seal having means to open and seal said air hole upon attraction of said magnet to said metallic component.

2. The drain system of claim 1 wherein said reservoir has a liquid exit port located in a lower area of said reservoir.

3. The drain of claim 1 wherein said valve lever has integral therewith a magnet, said magnet aligned in said valve housing with said metallic component so as to attract said metallic component when said metallic component is within a magnetic field set up by said magnet.

4. The drain of claim 1 wherein said valve housing has conduits open and in air flow connection with said air supply inlet and air outlet means.

5. The drain of claim 1 wherein said lever arm pivots on a pivot arm that is connected to said valve housing, said pivot arm movable with a change in height of said float, said lever arm being in a substantially horizontal position only when said air hole is in an open position.

6. The drain of claim 1 wherein said metallic component when aligned with a magnet in said valve housing causing said magnet to advance toward said metallic component thereby opening said air inlet means and causing accumulated liquid to flow out from said reservoir.

* * * * *